US010898909B2

(12) United States Patent
Liu et al.

(10) Patent No.: US 10,898,909 B2
(45) Date of Patent: Jan. 26, 2021

(54) WATER PRESSURE BOOSTING DEVICE

(71) Applicant: Pioneer Industries, Inc., Commerce, CA (US)

(72) Inventors: Shenghe Liu, Alhambra, CA (US); Montu Raval, Claremont, CA (US)

(73) Assignee: Pioneer Industries, Inc., Commerce, CA (US)

( * ) Notice: Subject to any disclaimer, the term of this patent is extended or adjusted under 35 U.S.C. 154(b) by 337 days.

(21) Appl. No.: 15/793,658

(22) Filed: Oct. 25, 2017

(65) Prior Publication Data
US 2019/0118194 A1    Apr. 25, 2019

(51) Int. Cl.
| | |
|---|---|
| *B05B 1/18* | (2006.01) |
| *B05B 7/04* | (2006.01) |
| *E03C 1/04* | (2006.01) |
| *B05B 3/04* | (2006.01) |
| *F04D 13/04* | (2006.01) |
| *E03C 1/084* | (2006.01) |
| *F04D 13/02* | (2006.01) |

(52) U.S. Cl.
CPC ............... *B05B 1/18* (2013.01); *B05B 3/04* (2013.01); *B05B 7/0425* (2013.01); *E03C 1/0408* (2013.01); *F04D 13/04* (2013.01); *E03C 1/084* (2013.01); *F04D 13/02* (2013.01)

(58) Field of Classification Search
CPC ........... B05B 1/18; B05B 3/04; B05B 7/0425; E03C 1/0408; E03C 1/084; F04D 13/02; F04D 13/04; F04D 25/02

USPC ....................................... 417/406; 239/428.5
See application file for complete search history.

(56) References Cited

U.S. PATENT DOCUMENTS

| | | | | |
|---|---|---|---|---|
| 2,691,549 A | * | 10/1954 | Hayward | B05B 3/0431 239/440 |
| 4,787,404 A | * | 11/1988 | Klosterman | B05B 7/045 134/102.2 |
| 5,154,355 A | * | 10/1992 | Gonzalez | B05B 7/0425 239/425.5 |
| 6,581,856 B1 | * | 6/2003 | Srinath | B05B 1/08 239/428 |
| 7,611,070 B2 | * | 11/2009 | Paoluccio | B05B 7/0425 239/9 |
| 9,297,153 B2 | * | 3/2016 | Takano | B05B 7/0425 |
| 2014/0261534 A1 | * | 9/2014 | Schepis | A61C 17/032 132/322 |

* cited by examiner

*Primary Examiner* — Connor J Tremarche
(74) *Attorney, Agent, or Firm* — LKP Global Law, LLP

(57) ABSTRACT

A water pressure boosting device includes an elongated, hollow body having a body wall positioned along a longitudinal plane of the elongated body to define a first chamber and a second chamber. The body wall includes a channel connecting the first chamber and the second chamber. The first chamber includes an inlet at a first end, an outlet at a second end, a passageway spanning between the inlet and the outlet, and a water turbine positioned within the passageway, in which the water turbine spins when a fluid flow passes through the passageway. The second chamber includes an air opening on the elongated body and an air turbine. The air turbine is positioned within the second chamber and rotatable about an axis, and the air turbine spins with the water turbine.

4 Claims, 12 Drawing Sheets

WATER PRESSURE BOOSTING DEVICE

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

The need for water has increased over the years as the result of the increase in human population, contamination of water supplies, and changes in weather patterns. Accordingly, water conservation has become increasingly important in order to ensure a sufficient water supply to meet current and future water demands. Water conservation not only focuses on the reduction of wasting water but also efficient use of water. For instance, numerous water-saving devices have been developed such as low-flush toilets, high efficiency clothes washers, and low-flow shower heads. While these devices use less water, there is a need for these devices to function as well as the non-water saving devices in order to continue adoption and use of water-saving devices.

SUMMARY

Briefly, and in general terms, various embodiments are directed to water pressure boosting devices. In one embodiment, the water pressure boosting device includes an elongated, hollow body having a body wall positioned along a longitudinal plane of the elongated body to define a first chamber and a second chamber. The body wall includes a channel connecting the first chamber and the second chamber. The first chamber includes an inlet at a first end, an outlet at a second end, a passageway spanning between the inlet and the outlet, and a water turbine positioned within the passageway, in which the water turbine spins when a fluid flow passes through the passageway. The second chamber includes an air opening on the elongated body and an air turbine. The air turbine is positioned within the second chamber and rotatable about an axis, and the air turbine spins with the water turbine.

In another embodiment, the water pressure boosting device includes a cylindrical body having a top wall, bottom wall, and a body wall spanning between the top wall and the bottom wall, in which the body wall defines a first chamber and a second chamber. The first chamber has a first opening on the top wall to receive a flow of fluid, and an outlet pipe extending from the bottom wall to allow the flow of fluid to exit the cylindrical body. The water pressure boosting device further includes a conduit positioned between the first opening and the outlet pipe. A water turbine is positioned within the first chamber, in which the flow of fluid through the conduit causes the water turbine to spin. The second chamber having an air hole in the cylindrical body and an air turbine positioned within a well within the first chamber. The well extends from the body wall into the second chamber, and the air turbine and the water turbine are rotatably coupled together. The water pressure boosting device also includes an air channel having a first end and a second end, in which the first end of the air channel is in communication with the first chamber and the second end of the air channel is in communication with the well of the second chamber.

In another embodiment, the water pressure boosting device includes an elongated, hollow body having a water conduit, a first vacuum generator, and a second vacuum generator, in which the water conduit is positioned between the first vacuum generator and the second vacuum generator. The water conduit includes an inlet at a first end, an outlet at a second end, a passageway spanning between the inlet and the outlet. A water turbine is positioned within the passageway, wherein the water turbine spins when a fluid flow passes through the passageway. The device further includes a first vacuum generator having a first air opening on the elongated body, a first air turbine positioned within a first air chamber, and a first air conduit in communication with the water conduit and the first vacuum generator. The device further includes a second generator including a second air opening on the elongated body, a second air turbine positioned within a second air chamber, and a second air conduit in communication with the water conduit and the second vacuum generator. The device further includes an axle provided spanning across the body, wherein the first air turbine, the second air turbine, and water turbine are rotatably mounted on the axle.

Other features and advantages will become apparent from the following detailed description, taken in conjunction with the accompanying drawings, which illustrate by way of example, the features of the various embodiments.

DETAILED DESCRIPTION

Figure 1:
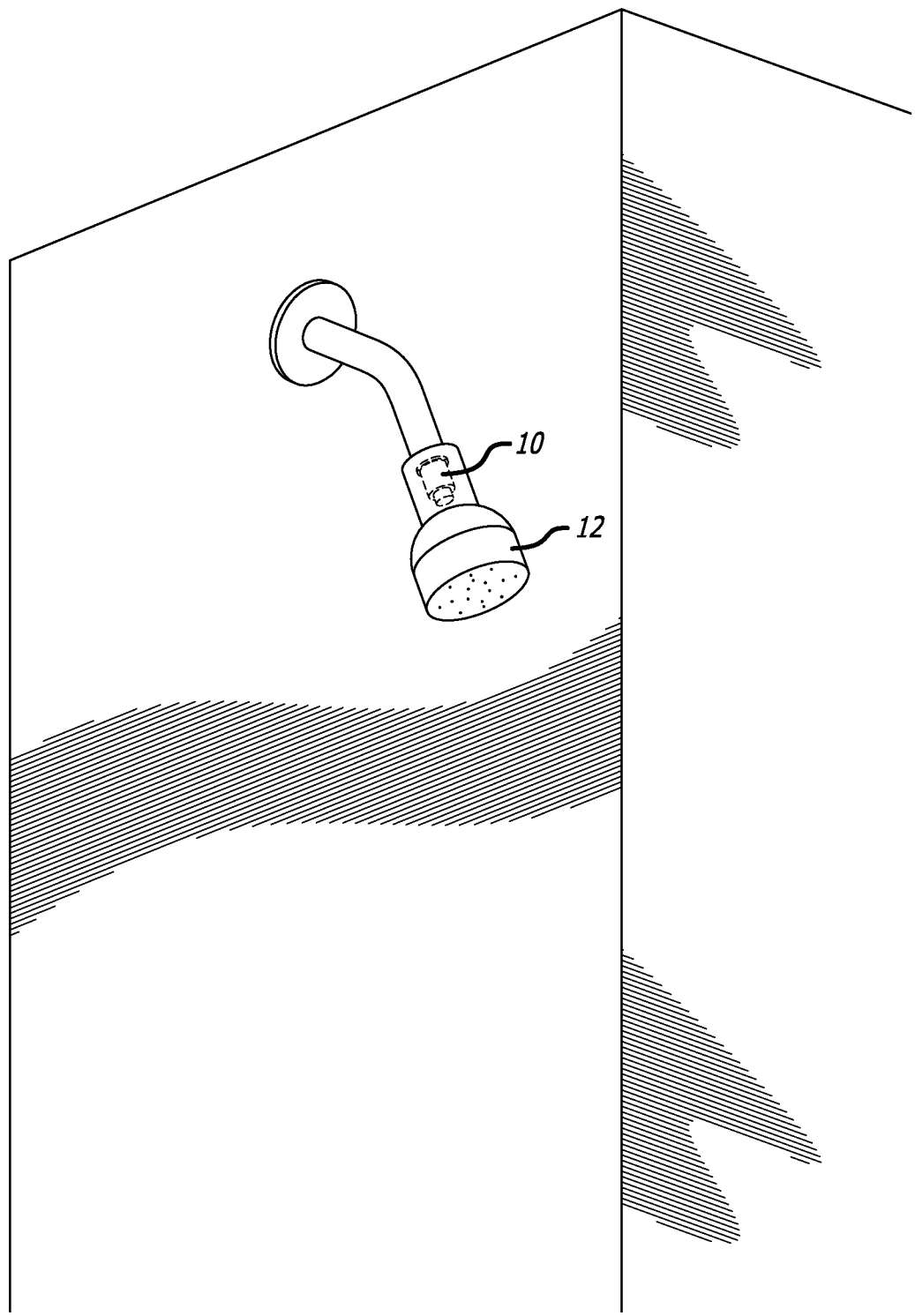
FIG. 1 is a perspective view of one embodiment of the device installed in a showerhead.

Various embodiments are directed to water pressure boosting devices. In one embodiment, the water pressure boosting device includes a hollow body that is divided into a first chamber and a second chamber by a central body. The central body includes an air channel connecting the first chamber and the second chamber. The first chamber includes an inlet at a first end, an outlet at a second end, and a passageway spanning between the inlet and the outlet. A water turbine is positioned within the passageway, in which the water turbine spins when a fluid flow passes through the passageway. The second chamber includes an air opening on the elongated body and an air turbine. The air turbine is positioned within the second chamber and rotatable about an axis, and the air turbine spins with the water turbine As shown in FIG. 1, the water pressure boosting device 10 is installed within a showerhead 12 fixed within a shower. In other embodiments, the water pressure boosting device may be installed within aerators, pre-rinse spray valves, handheld showerheads, pull-down showerheads, faucets, or other water fixtures known or developed in the art.

Figure 2:
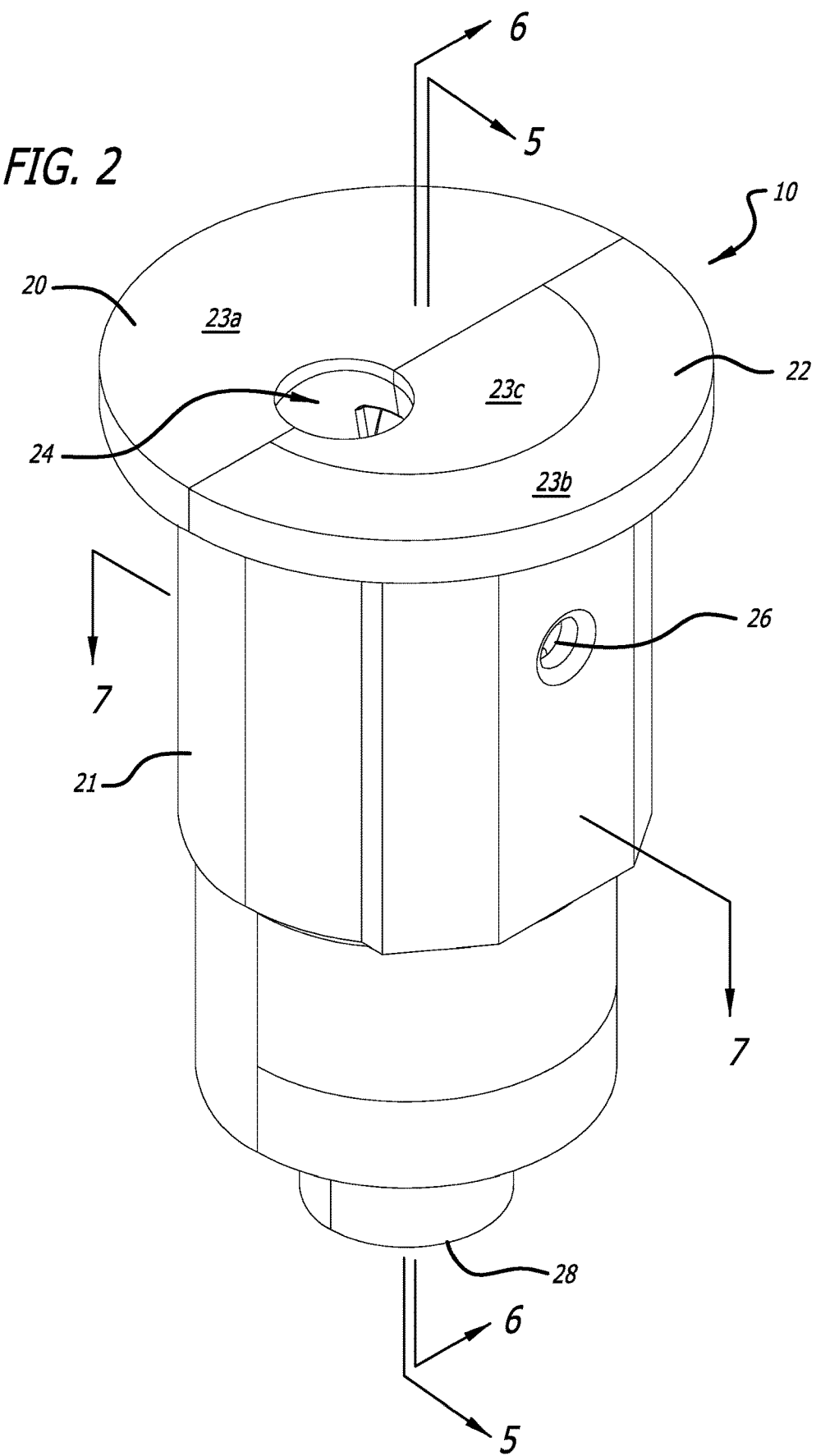
FIG. 2 is a perspective view of one embodiment of the device.

FIG. 2 illustrates one embodiment of a water pressure boosting device 10. In the embodiment shown in FIG. 2, the water pressure boosting device 10 has a left housing 20, a right housing 22, and a center body 27. For the sake of simplicity and ease of reference, but not by way of limitation, various components of the device 10 may be referred to as the "left" and/or "right" component.

As shown in FIG. 2, each of the left housing 20, right housing 22, and center body (not shown) have an upper surface 23a, 23b, 23c, respectively. The upper surfaces 23a, 23b, 23c form a circular-shaped flat surface. As shown in FIG. 2, the overall diameter of the combined upper surfaces 23a, 23b, 23c is larger than the diameter of the body 21. Alternatively, the overall diameter of the upper surfaces may be varied so that the device will fit snugly within the bore of a pipe and/or a water fixture. In another embodiment, an O-ring (not shown) fixed to the outer circumference of the circular shaped surface formed by the upper surfaces 23a, 23b of the left housing 20 and the right housing 22 to provide a better seal.

As shown in FIG. 2, the upper surfaces 23a, 23c have a cut-out to form an opening 24 which serves as the water inlet for the device 10. When inserted into a water fixture, water flows into the opening 24 through the device 10 and exits through the outlet 28 of the device. The device 10 also includes an opening 26 is provided on the body 21 of the right housing 22. The opening 26 is in communication with the ambient environment via a corresponding opening (not shown) on the water fixture.

Figure 3:
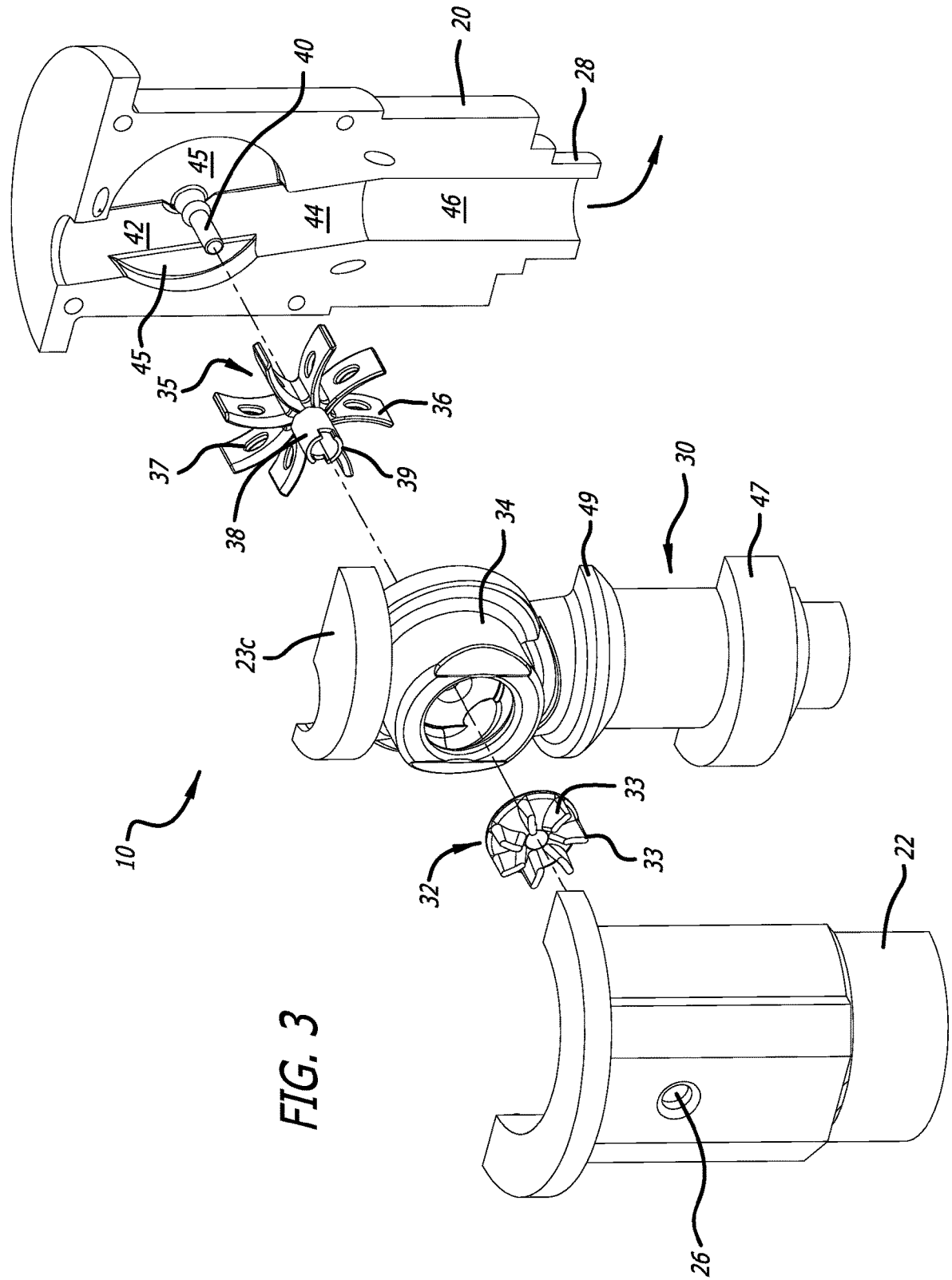
FIG. 3 is a front-facing exploded view of one embodiment of the device.

FIG. 3 is an exploded view of the device 10 showing the right housing 22, center body 30, and right housing 20. The center body 30 includes an upper surface 23c and a vacuum generator housing 34 positioned below the upper surface. As shown in FIG. 3, the vacuum generator housing 34 is integral with the center body 30. In alternate embodiments, the vacuum housing may be separate component that may be fixed to the center body 30. The vacuum generator housing 34 is cylindrical in shape and defines a chamber that is shaped and sized to allow the turbine 32 to freely spin within the chamber.

The turbine 32 includes a plurality of vanes 33 that are shaped to draw air through the opening 26 into the vacuum generator housing 34. The turbine 32 spins about the fixed axle 40 positioned on the left housing 20. In an alternate embodiment, the turbine 32 spins about a freely rotatable axle (not shown).

The center body 30 further includes body seals 47, 49 positioned on the lower portion of the center body that engage the right housing 22. In an alternate embodiment, there may be a single seal (not shown) on the center body. In yet another embodiment, the center body 30 may include a plurality of seals along the length of the center body.

As shown in FIG. 3, a water turbine 35 includes a plurality of curved vanes 36. Each vane 36 includes an opening 37. In an alternate embodiment, the vanes (not shown) may not include any openings. In another alternate embodiment, the vanes (not shown) are not curved. As shown in FIG. 3, the turbine 35 includes an axle 38 that extends away from hub of the turbine. The axle 38 includes notches 39 at one end of the axle that engage corresponding grooves 64 on the back surface of the vacuum generating turbine 32. When water flows through the inlet, it causes the water turbine 35 to spin which in turn causes the vacuum generating turbine 32 to spin since the turbines are engaged with one another via the axle 38.

Figure 4:
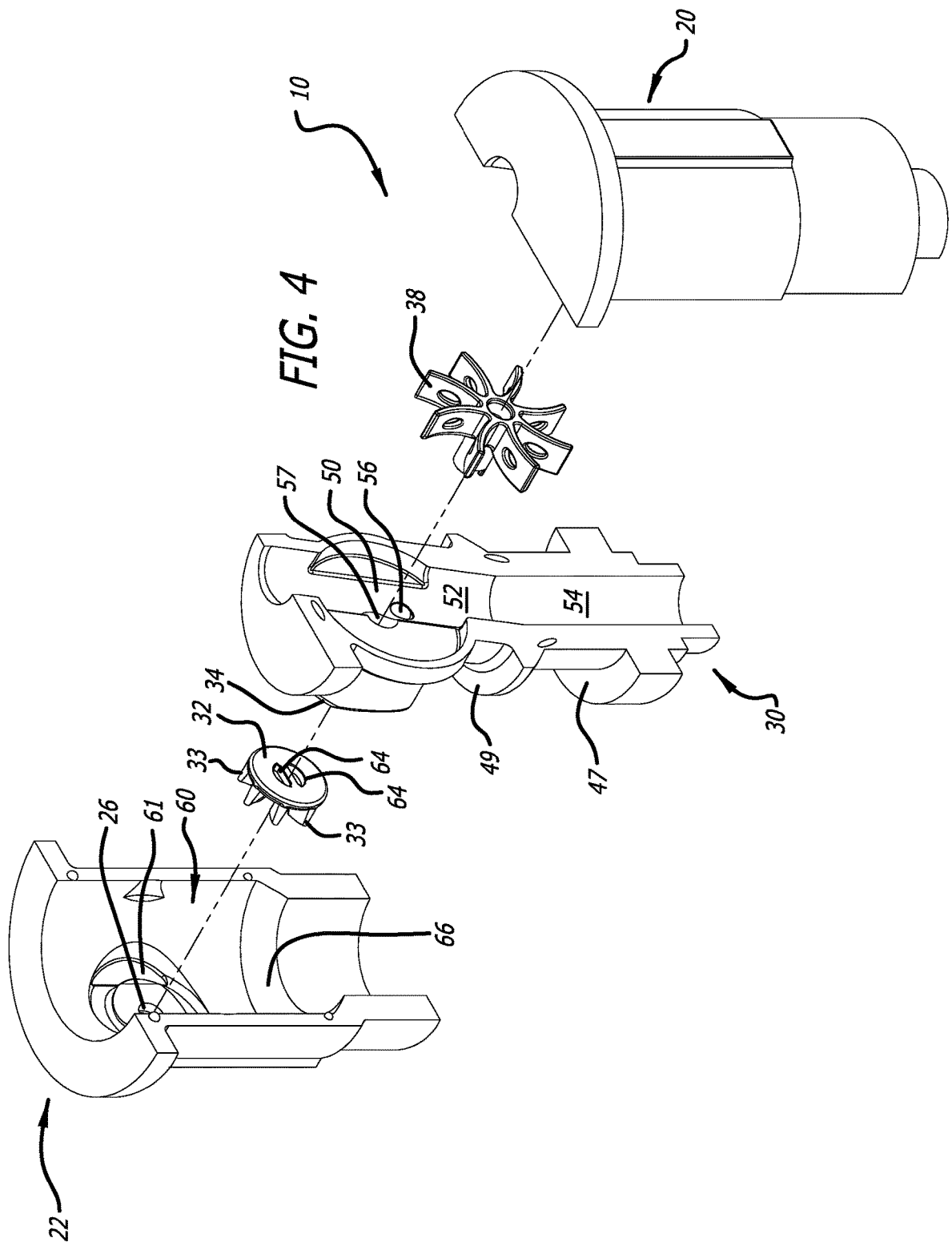
FIG. 4 is a back-facing exploded view of one embodiment of the device.

The left housing 20 of the device 10 includes an inlet passage 42 connected to an outlet passage 46 via a transitional passage 44. The passages 42, 44, 46 have corresponding passages 50, 52, 54 on the center housing 30 as shown in FIG. 4. When the center housing 30 and left housing 20 are coupled together, the corresponding passages on each part form a pipe through which water passes. Referring back to FIG. 3, the left housing 20 also includes a recess in the inner portion of the housing that is shaped to receive and allow the water turbine 35 to spin freely about the axle 40. As shown in FIG. 3, the axle is an integral component of the left housing. In an alternate embodiment, the axle (not shown) may be a separate component that is attached to the left housing 20.

FIG. 4 illustrates another exploded view of the device 10 showing the back surface of the right body 22 and center body 30 and the front surface of the left body 20. The back surface of the right body 22 includes a recessed groove 61 that is shaped and sized to engage the vacuum generator housing 34. As shown in FIG. 4, the recessed groove 61 is positioned on the right body 22 so that the opening 26 is approximately centered on the vacuum generating housing 34. The right body 22 also includes a ridge 66 on the inner surface that engages a corresponding seal 49 on the center body 30. In alternate embodiments, the seals 47, 49 may include O-rings or gaskets (not shown) to improve sealing.

Figure 5:
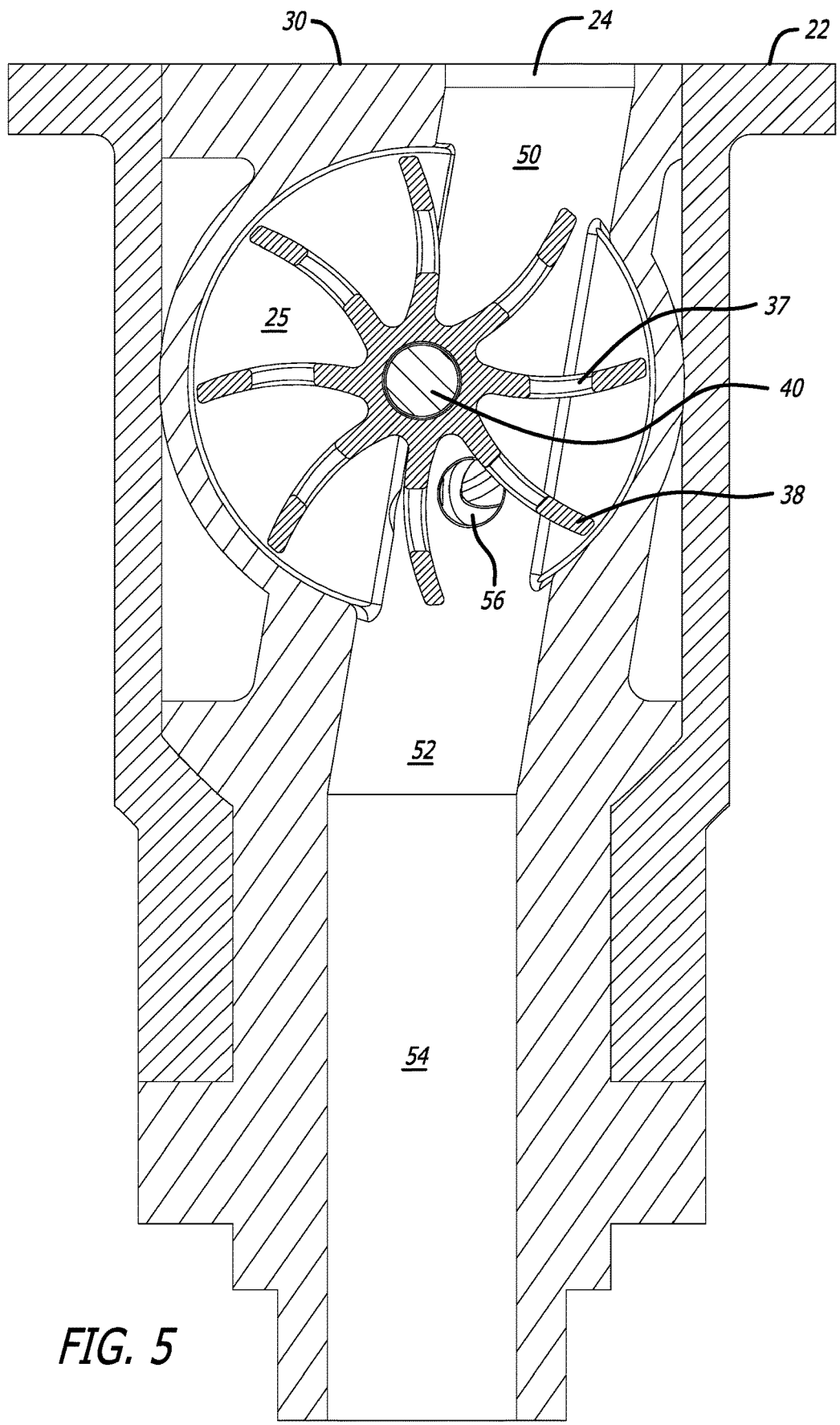
FIG. 5 is a cross-sectional view of one embodiment of the device taken along line 5-5 shown in FIG. 1.
Figure 7:
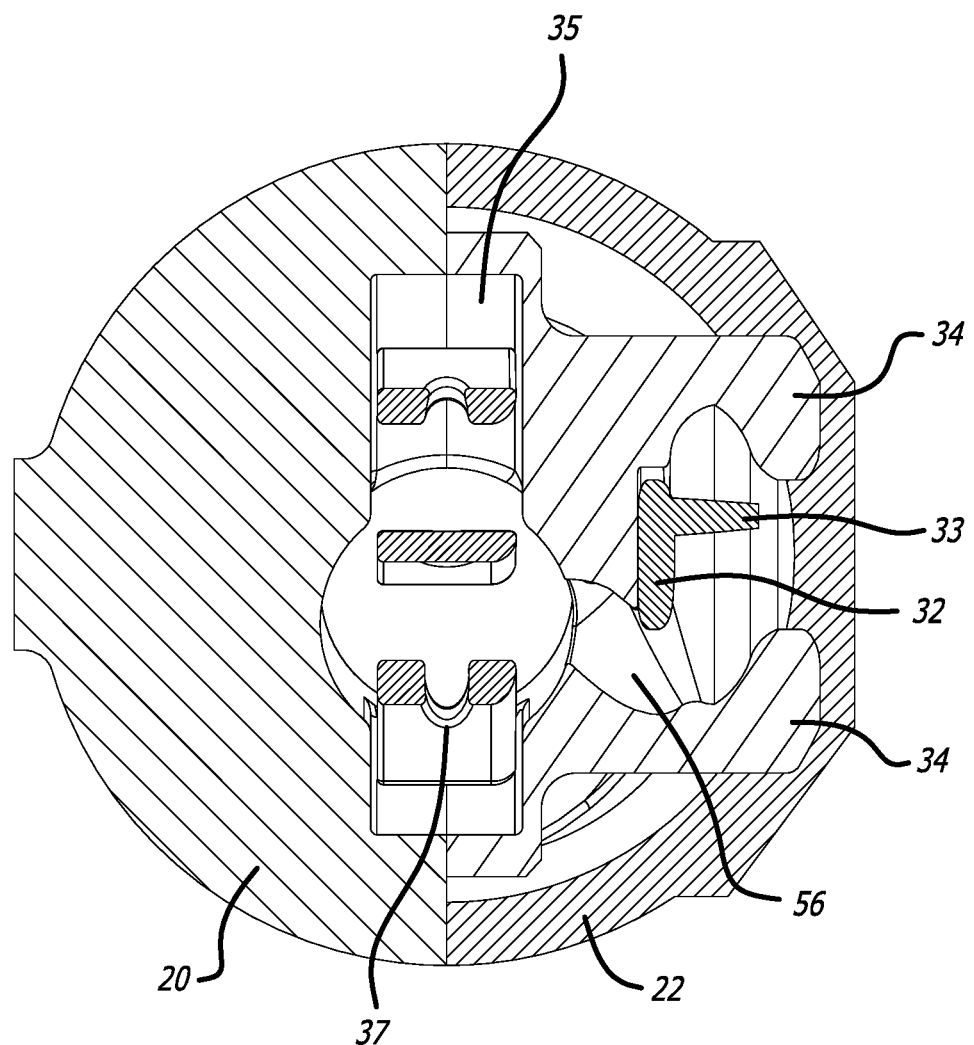
FIG. 7 is a cross-sectional view of one embodiment of the device taken along line 7-7.

As shown in FIG. 4, the center body 30 includes a port 56. The port 56 connects the vacuum generating space, namely the space between the right body 22 and the center body 30 to the water pipe formed when the left housing 20 and center body 30 are coupled together. As shown in FIGS. 5 and 7, the port 56 is curved and shaped so that the water does not enter the vacuum generating space. As shown in FIGS. 5 and 7, the port 56 is curved with a low point at in the middle of the port. Additionally, the port 56 is also curved such that the port is not a straight tube. That is, the port may be curved left to right or right to left. In one embodiment, the port 56 may include a check valve (not shown) to further prevent water from entering the vacuum generating space.

FIG. 5 is a cross-section view of the device 10 taken along line 5-5. FIG. 5 illustrates the center housing 30 positioned within the right housing 22. The water turbine 35 is positioned within a cavity 25 and is mounted onto and spins about a shaft 40 positioned in the center of the cavity. As shown in FIG. 5, the water inlet 24 opens into a water channel having an upper portion 50, middle portion 52 and a lower portion 54. In one embodiment, the various portions 50, 52, 54 of the water channel have varying diameters. In an alternate embodiment, the various portions of the water channel have the same diameter. As shown in FIG. 5, the upper portion 50 of the water channel is angled relative to the center body 30. In an alternate embodiment, the upper portion of the water channel (not shown) may be parallel to the longitudinal axis of the center body 30. The middle portion 52 of the water channel is slightly angled and provides a transition to the vertical lower portion 54 of the water channel. In those embodiments in which the diameters of the water channel 50, 52, 54 varies, a transition 55 is provided between different channel diameters. In alternate embodiments, the middle portion (not shown) of the water channel is not included in the water channel, and the upper channel will directly connect to the lower channel.

Figure 6:
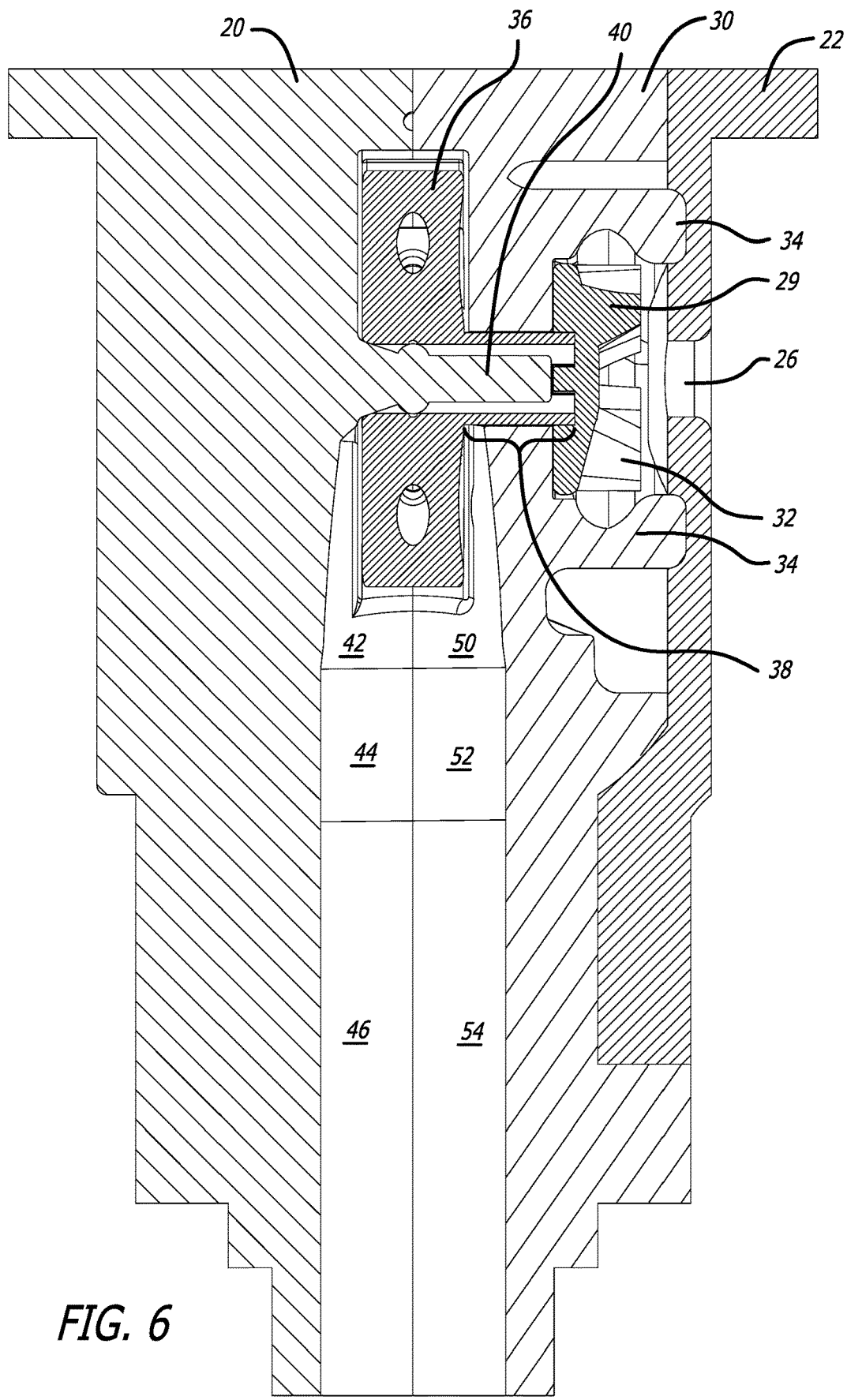
FIG. 6 is a cross-sectional view of one embodiment of the device taken along line 6-6.

FIG. 6 is a cross-section view of the device taken along line 6-6. As shown in FIG. 6, the left housing 20 is coupled to the center housing 30 and the right housing 22. With the left housing and center housing couple together, the respective upper 42, 50, middle 44, 52 and lower 46, 54 portions of the water channels form a water conduit. As show in FIG. 6, the water turbine 36 is positioned within the water conduit. The water turbine 36 is mounted to and spins about the shaft 40 when the blades of the water turbine are struck by water flowing through the device. The water turbine 36 includes and axle 38 extending away from the main body of the turbine. The axle 38 extends through an opening 57 in the center body 30 to engage the body 29 of the vacuum generator turbine 32.

As the water turbine 36 spins due to water flowing through the device 10, the vacuum generator turbine 32 also spins. As the vacuum generator turbine spins, ambient air is drawn through the air intake 26 into the vacuum generator housing 34. The air is pushed through the air channel 56 as shown FIG. 7 into the water conduit. The air combines with the flowing water to improve the performance of the water fixture (not shown) and reduce water usage. That is, while less water is flowing through the device 10, the addition of the air effectively increases the water pressure through the device 10 and ultimately the water fixture.

Figure 8:
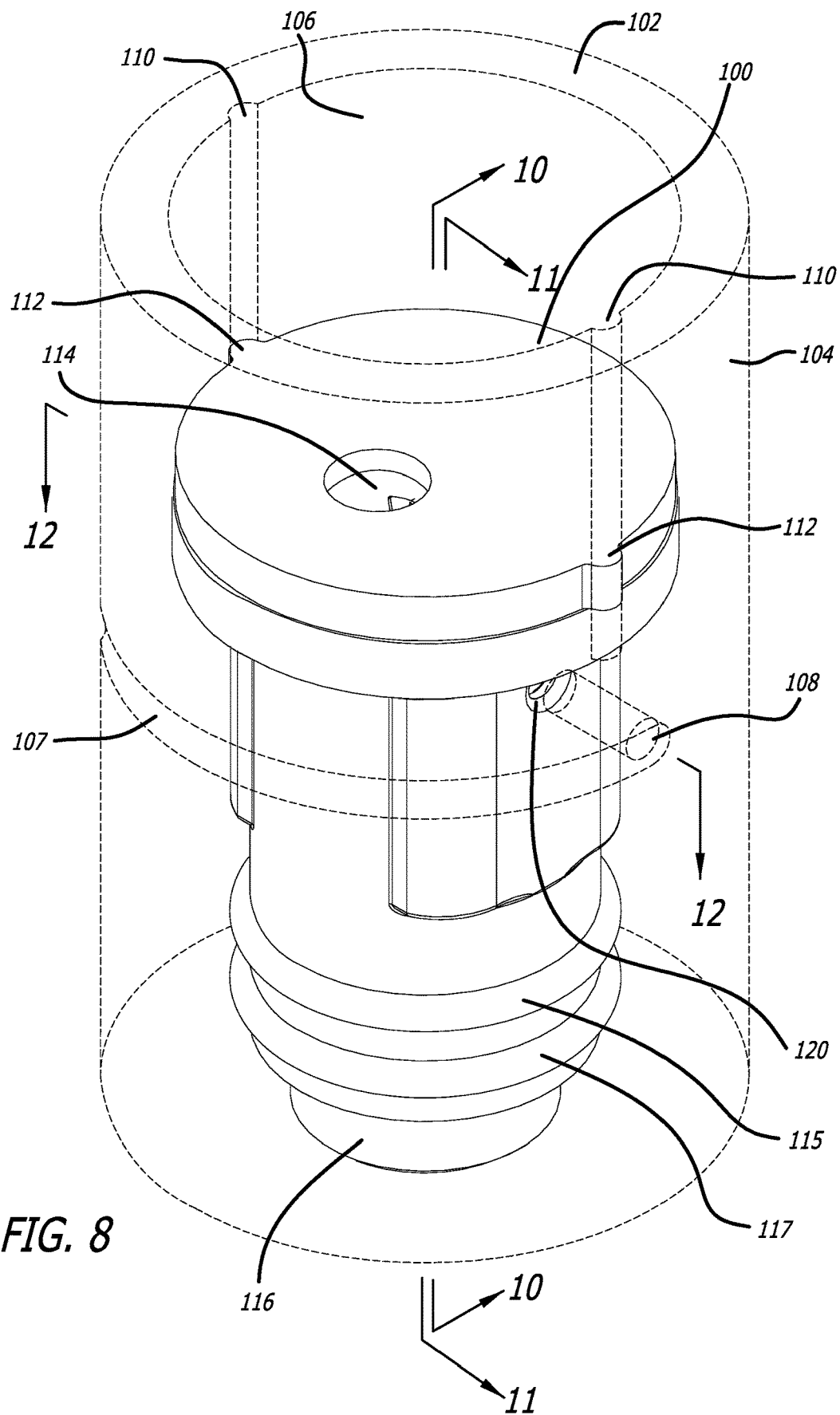
FIG. 8 is a perspective view of another embodiment of the device.

FIG. 8 illustrates another embodiment of a water pressure boosting device 100 positioned within a sleeve 102. The sleeve 102 is an elongated cylindrical body with an outer surface 104 and an inner surface 106. As shown in FIG. 8, the sleeve 102 includes an air tube 108 that extends from the outer surface 104 to the inner surface 106. The air tube 108 would allow ambient air to enter the device 100 through the air inlet 120. The sleeve 102 also includes grooves 110 on the inner surface that are shaped and sized to engage corresponding projections 112 provided on the top surface of the device 100. In an alternate embodiment, the projections (not shown) are separate components such as more or more rods that may be used to properly align the device 100 within the sleeve 102.

Figure 12:
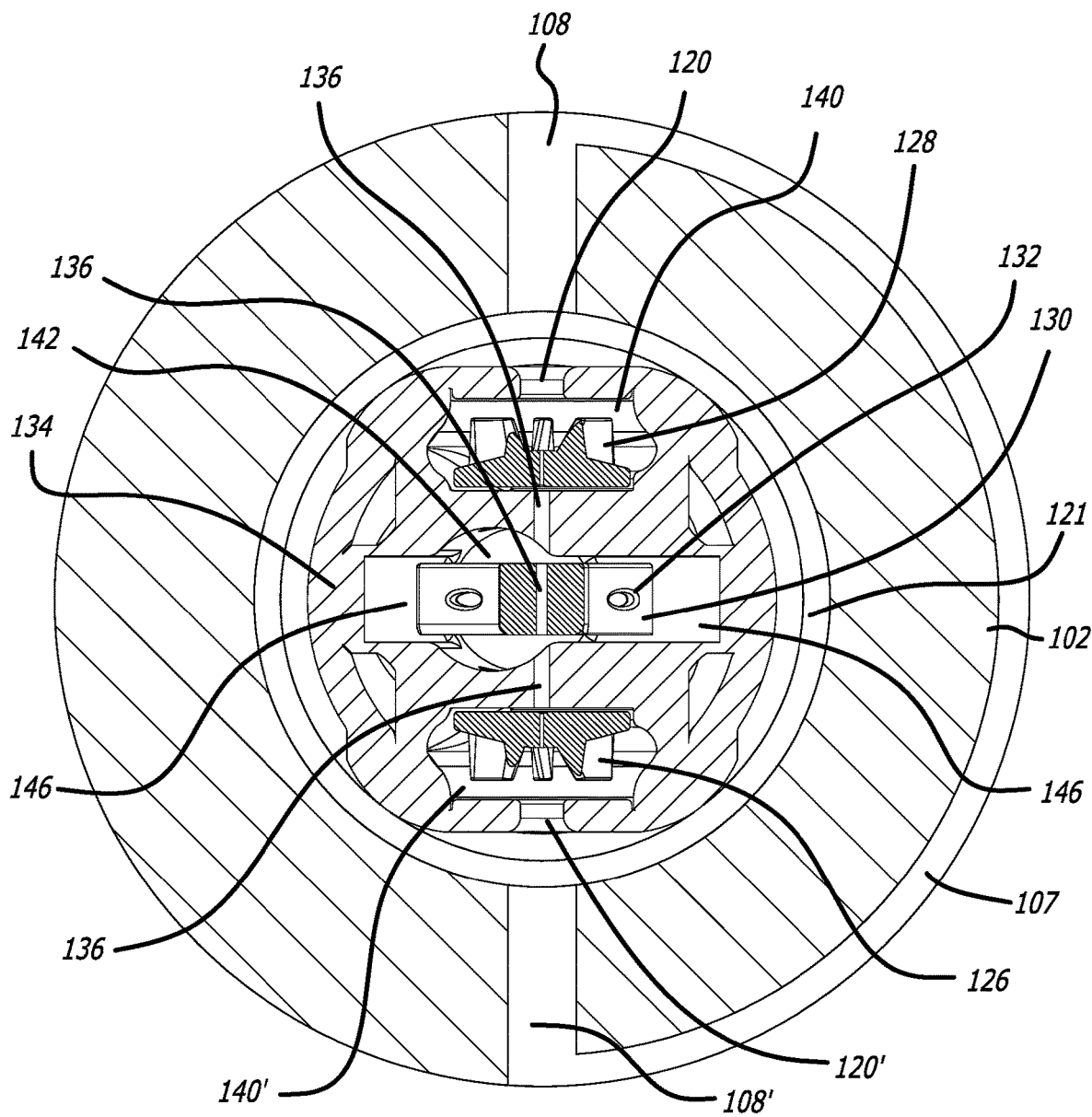
FIG. 12 is a cross-sectional view of the embodiment of the device taken along line 12-12 shown in FIG. 8.

The combination of the device 100 and the sleeve 102 may be inserted into a water fixture (not shown). The sleeve 102 further includes a groove 107 spanning on the outer surface between the air tube 108, 108' as shown in FIGS. 8 and 12. This groove 107 allows the combination of the device 100 and sleeve 102 may be positioned within a water fixture without having to properly orient the air opens on the device and sleeve with an air opening on the water fixture.

As shown in FIG. 8, the device includes a water inlet 114 and a water outlet 116. The device 100 also includes O-rings 115, 117 on the outer surface of the device to prevent the back flow of water into the device and/or the space between the sleeve 102 and the device. In alternate embodiments, a different number of seals may be utilized. For example, in one embodiment, a single seal is provided on the outer surface of the device. Alternatively, more than two seals may be provided on the outer surface of the device. In other embodiments, other sealing devices, components, or mechanisms known and developed in the art (other than O-rings) may be utilized to provide a seal.

Figure 9:
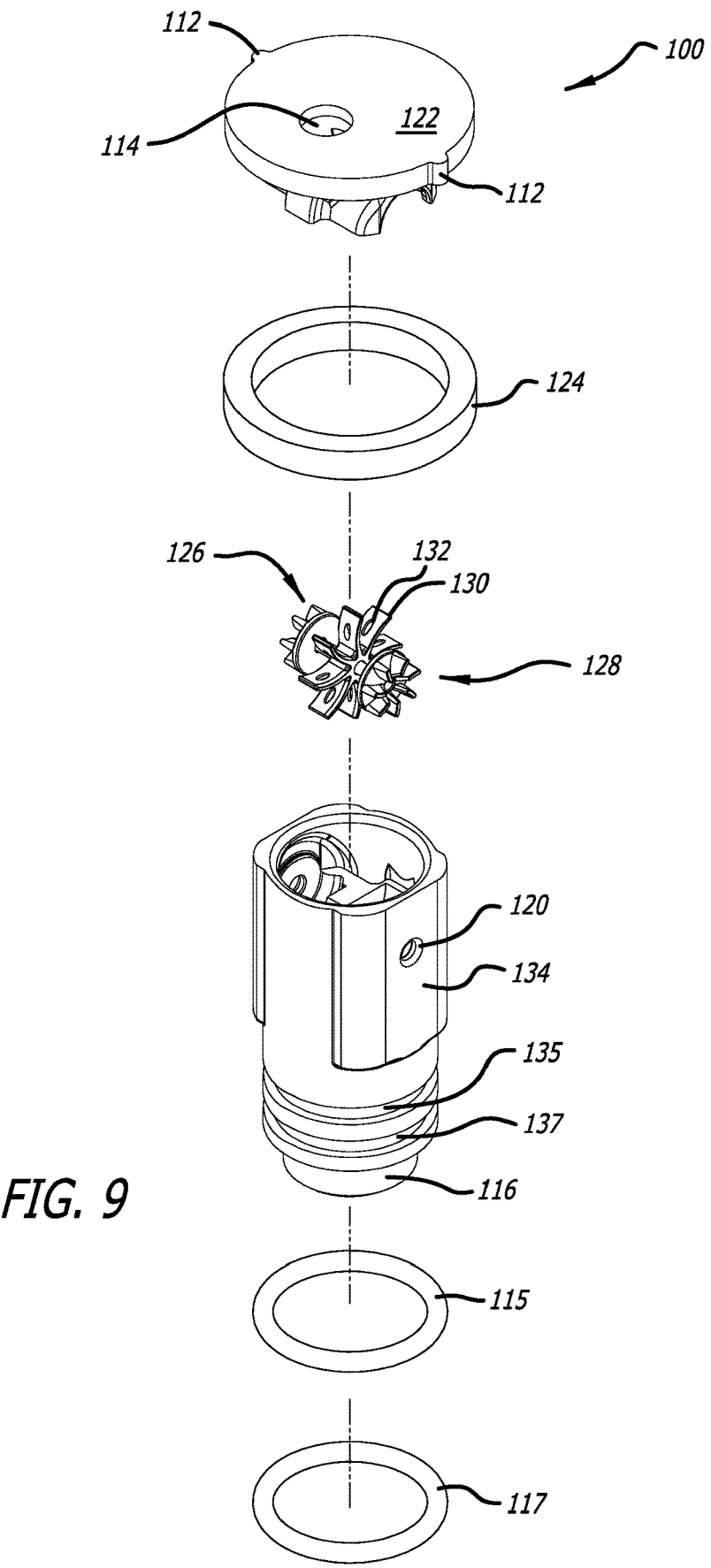
FIG. 9 is an exploded, perspective view of the embodiment of the device shown in FIG. 8.
Figure 10:
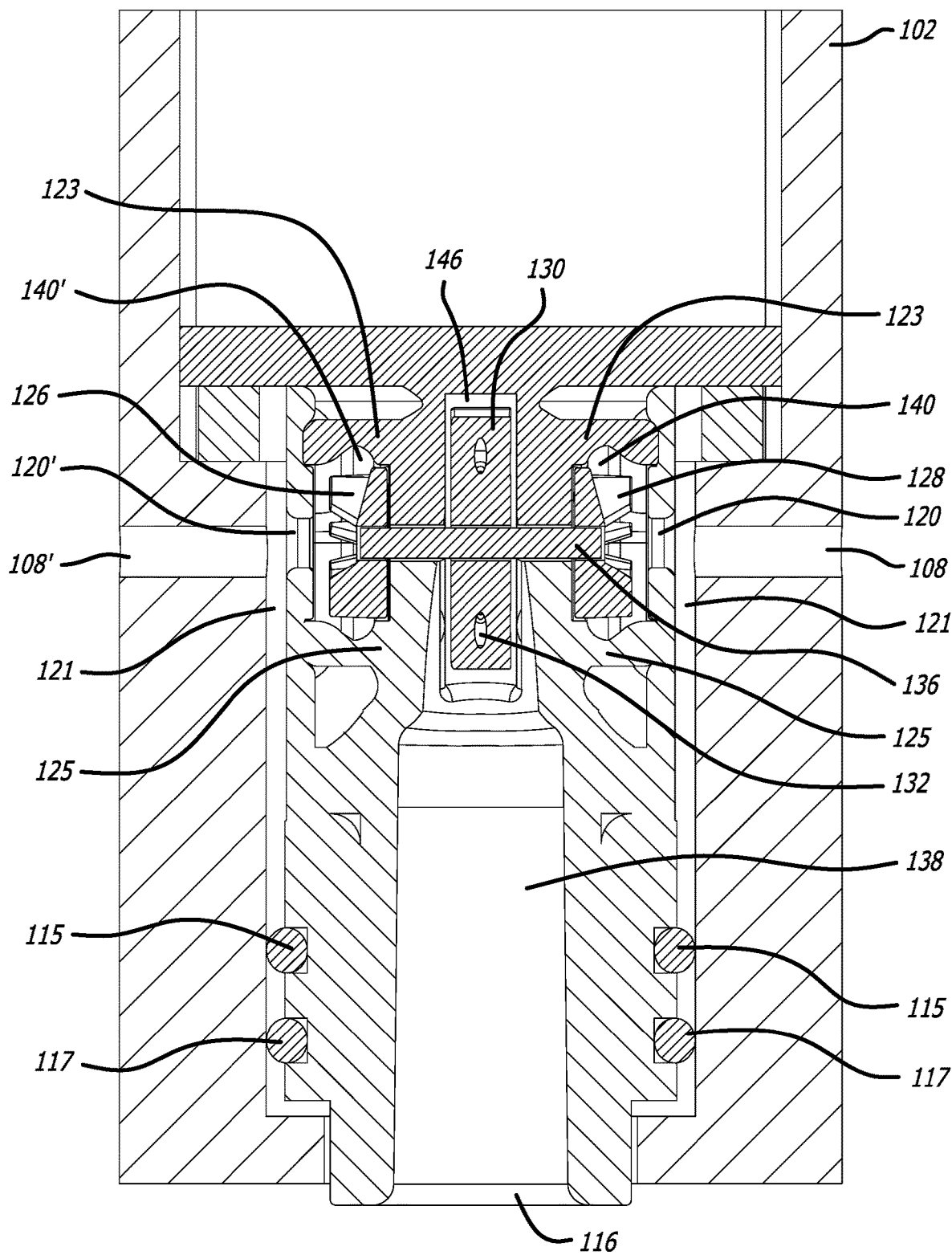
FIG. 10 is a cross-sectional view of the embodiment of the device taken along line 10-10 shown in FIG. 8.
Figure 11:
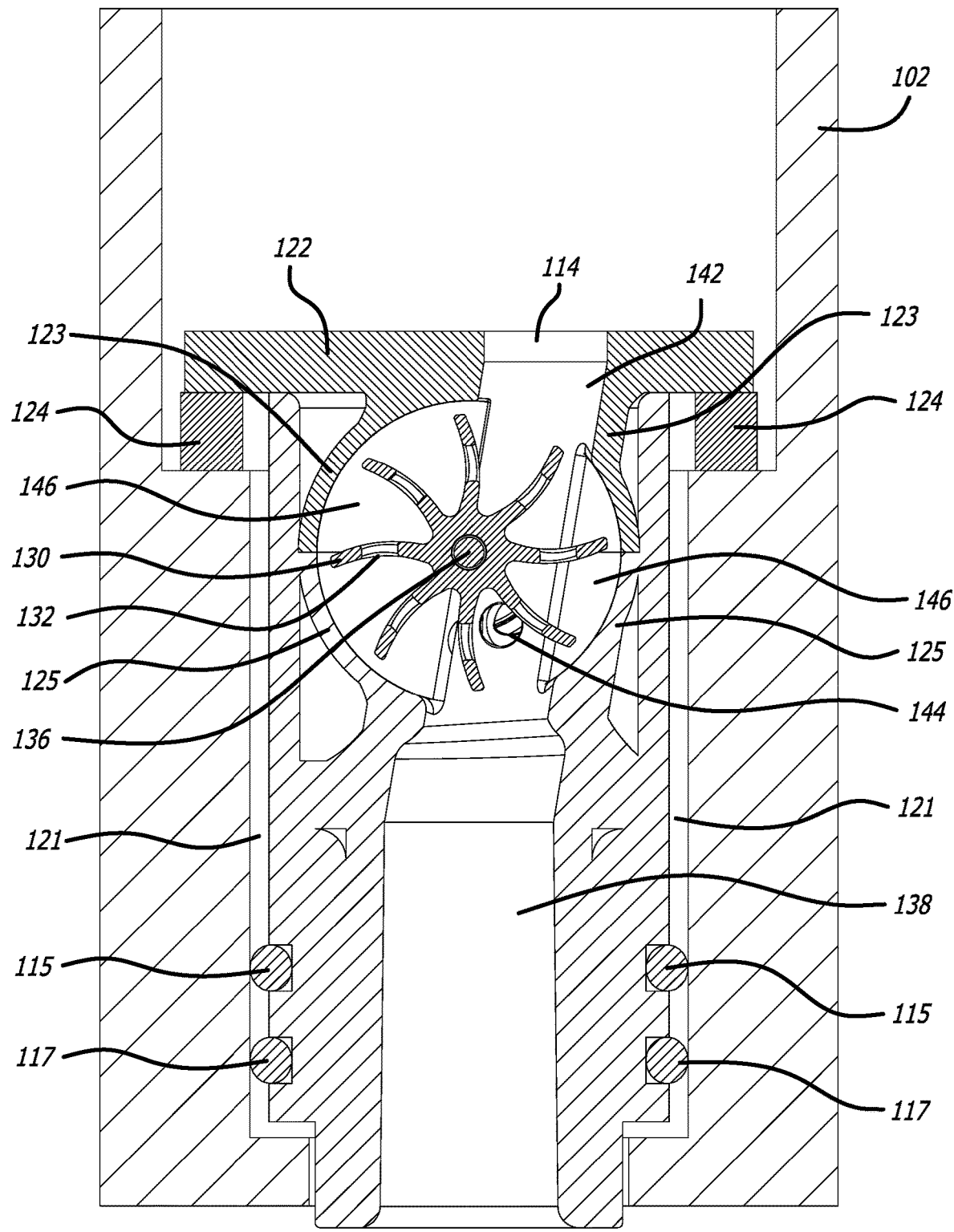
FIG. 11 is a cross-sectional view of the embodiment of the device taken along line 11-11 shown in FIG. 8.

FIG. 9 illustrates the various components of the water pressure boosting device 100. Generally, in this embodiment, the device 100 includes a water conduit portion and two vacuum generating portions. The water conduit portion (as shown in FIGS. 10-12) includes a water inlet, water outlet, and a water conduit spanning between the water inlet and water outlet. A water turbine is also provided within the water conduit, in which the water turbine spins about an axis in response to the flow of water through the water conduit. Each vacuum generating portion (as shown in FIGS. 10-12) of the device includes an air inlet, an air turbine, and an air channel in communication with the water conduit. The vacuum generating portions are When the water turbine spins, the air turbines in each vacuum generation portion of the device also spin as these turbines are rotatably coupled together. When the air turbines spin, ambient air is drawn through the air inlet into the vacuum generating portion of the device. The air from the vacuum generating portion of the device enters the water conduit through an air channel. The air combines with the flow of water to increase the water velocity and water force exiting the water fixture.

Referring back to FIG. 9, the device 100 includes a top 122 having a water inlet 114 and an elongated, cylindrical body 134. The inlet is sized to restrict the flow of water into the device, which restricts the volume of water flowing through the water fixture (not shown). The device 100 includes a gasket 124 positioned between the top 122 and body 134. The device 100 further includes two air turbines 126, 128 positioned on either side of the water turbine 130. The water turbine includes openings 132 on each turbine blade. In other embodiments, one or more openings may be provided on alternating turbine blades (not shown) or on each turbine blade. In one embodiment, the turbines 126, 128, 130 and mounted onto and spin on a common axle. In another embodiment, the turbines may mounted and spin on individual axles wherein the axles are rotatively coupled together by one or more gears (not shown). As shown in FIG. 9, the body 134 is elongated and may include one or more grooves 135, 137 that are sized to receive and hold O-rings, gaskets, or other sealing members.

FIG. 10 is a cross-section view of the device 100 take along line 10-10. The device 100 is positioned with the sleeve 102. At the top interface between the device 100 and the sleeve, the top 122 of the device is sized to fit within the inner diameter of the sleeve to minimize the gap between the two components. The device 100 includes a gasket 124 to provide seal to prevent water from entering the vacuum chambers or the air space 121. In an alternate embodiment, the top (not shown) may include a groove sized to receive an O-ring or other sealing member to prevent water from entering the air space 121. At the base of the device 100, there are O-rings 115, 117 which seal against the inner wall of the sleeve 102. This prevents the backflow of water into the vacuum portions 140, 140' of the device 100 via the air inlets 120, 120' or out of the sleeve 102 through the air tubes 108, 108'.

As shown in FIG. 10, the lower portion of the water conduit 138 is shown, and a water turbine 130 is positioned within the conduit. The water turbine is rotatably coupled to an axle 136. Air turbines 126, 128 are coupled to opposite ends of the axle 136. The bottom portion 123, 123' of the top 122 is shaped to engage the inner portion 125, 125' of the body 134. The bottom portions 123, 123' of the top 122 and the inner portions 125, 125' of the body 134 form the water conduit 138 and vacuum chambers 140, 140'. The air turbines 126, 128 are positioned within the vacuum chambers 140, 140'.

FIG. 11 is a cross-sectional view of the device 100 take along line 11-11. As shown in FIG. 11, the top 122 of the device 100 includes a water inlet 114. The bottom portion 123, 123' of the top and the inner portion 125, 125' of the body 134 form the upper water conduit 142 and the water turbine chamber 146. The air channel 144 between the water conduit 142 and the vacuum chamber is also shown in FIG. 11. As shown in FIG. 11, the upper portion 142 of the water conduit is angled relative to the longitudinal (lengthwise) axis of the device body 134.

FIG. 12 is a cross-sectional view of the device 100 take along line 12-12. As shown in FIG. 12, the relationship and orientation of the water turbine 130 and the air turbines 126, 128. Also, FIG. 12 shows the water conduit 142, water turbine chamber 146 relative to the vacuum generating chambers 140, 140'.

The various embodiments described above are provided by way of illustration only and should not be construed to limit the disclosed invention. Those skilled in the art will readily recognize various modifications and changes that may be made to the disclosed invention without following the example embodiments and applications illustrated and described herein, and without departing from the true spirit and scope of the disclosed invention.

The invention claimed is:

1. A low-flow, water pressure boosting device, comprising:
   an elongated, hollow body having a water conduit, a first vacuum generator, and a second vacuum generator, wherein the water conduit is positioned between the first vacuum generator and the second vacuum generator;
   the water conduit including an inlet at a first end, an outlet at a second end, a passageway spanning between the inlet and the outlet, wherein a diameter of the passageway increases between the inlet and the outlet, and a water turbine positioned within the passageway, wherein the water turbine spins when a fluid flow passes through the passageway;
   the first vacuum generator including a first air opening on the elongated body, a first air turbine positioned within a first air chamber, and a first air conduit in communication with the water conduit and the first vacuum generator;
   the second generator including a second air opening on the elongated body, a second air turbine positioned within a second air chamber, and a second air conduit in communication with the water conduit and the second vacuum generator; and
   an axle provided spanning across the body, wherein the first air turbine, the second air turbine, and water turbine are rotatably mounted on the axle whereby the rotation of the water turbine causes the first and second air turbines to spin which draws air into the first and second air turbines and pushes air through the first and second air conduits into the water conduit.

2. The device of claim 1, further comprising a cylindrical sleeve having an inner surface and an outer surface, the cylindrical sleeve having an inner diameter sized to receive the elongated, hollow body, wherein the sleeve includes a first air pipe opposite second air pipe, wherein the first and second air pipes extend from the exterior of the sleeve to the interior of the sleeve.

3. The device of claim 1, wherein a portion of the water conduit is angled relative to a longitudinal axis of the elongated, hollow body.

4. A low-flow, water pressure boosting device, comprising:
   an elongated, hollow body having a water conduit, a first vacuum generator, and a second vacuum generator, wherein the water conduit is positioned between the first vacuum generator and the second vacuum generator;
   the water conduit including an inlet at a first end, an outlet at a second end, a passageway spanning between the inlet and the outlet, and a water turbine positioned within the passageway, wherein the water turbine spins when a fluid flow passes through the passageway;
   the first vacuum generator including a first air opening on the elongated body, a first air turbine positioned within a first air chamber, and a first air conduit in communication with the water conduit and the first vacuum generator;
   the second generator including a second air opening on the elongated body, a second air turbine positioned within a second air chamber, and a second air conduit in communication with the water conduit and the second vacuum generator;
   an axle provided spanning across the body, wherein the first air turbine, the second air turbine, and water turbine are rotatably mounted on the axle; and
   a cylindrical sleeve having an inner surface and an outer surface, the cylindrical sleeve having an inner diameter sized to receive the elongated, hollow body, wherein the sleeve includes a first air pipe opposite second air pipe, wherein the first and second air pipes extend from the exterior of the sleeve to the interior of the sleeve, and wherein the sleeve further includes a channel extending between the first air pipe to the second air pipe, wherein the channel is positioned along the outer surface of the cylindrical sleeve.

* * * * *